United States Patent
Chen

(10) Patent No.: US 9,391,518 B2
(45) Date of Patent: Jul. 12, 2016

(54) CURRENT SENSING CIRCUIT FOR SWITCHING POWER CONVERTERS

(71) Applicant: Semiconductor Components Industries, LLC, Phoenix, AZ (US)

(72) Inventor: Gang Chen, Hong Kong (CN)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 230 days.

(21) Appl. No.: 14/301,475

(22) Filed: Jun. 11, 2014

(65) Prior Publication Data

US 2015/0364995 A1    Dec. 17, 2015

(51) Int. Cl.
*H02M 3/156* (2006.01)
*H02M 3/158* (2006.01)
*H02M 1/00* (2006.01)

(52) U.S. Cl.
CPC .............. *H02M 3/158* (2013.01); *H02M 3/156* (2013.01); *H02M 3/1584* (2013.01); *H02M 2001/0009* (2013.01); *H02M 2003/1586* (2013.01)

(58) Field of Classification Search
CPC .................... H02M 3/1584; H02M 2003/1586
See application file for complete search history.

(56) References Cited

U.S. PATENT DOCUMENTS

| 5,877,611 A * | 3/1999 | Brkovic | G05F 1/575 323/222 |
| 6,246,220 B1 * | 6/2001 | Isham | H02M 3/1588 323/224 |
| 6,441,597 B1 | 8/2002 | Lethellier | |
| 7,358,710 B2 * | 4/2008 | Luo | H02M 3/1588 323/272 |
| 8,395,368 B2 * | 3/2013 | Ouyang | H02M 3/1588 323/259 |
| 2005/0219926 A1 * | 10/2005 | Tai | H02M 3/1588 365/207 |

* cited by examiner

*Primary Examiner* — Timothy J Dole
*Assistant Examiner* — Ishrat Jamali
(74) *Attorney, Agent, or Firm* — Rennie William Dover

(57) ABSTRACT

A current sensing circuit for a switched mode power converter employs a passive current sensing network coupled in parallel with the switched inductor. The passive current sensing network is impedance matched to the inductance its inherent resistance, and provides a current sensing node for single wire current sensing by a current sensing circuit. The passive current sensing network can be employed in each of a plurality of phased switching circuits that each contribute to an output of the power converter.

16 Claims, 6 Drawing Sheets

US 9,391,518 B2

CURRENT SENSING CIRCUIT FOR SWITCHING POWER CONVERTERS

FIELD OF THE DISCLOSURE

The present disclosure relates generally to power regulation circuits, and particularly to current sensing in switched-mode power converters.

BACKGROUND

A switched-mode power supply (SMPS) utilizes energy storage in the magnetic field of an inductance, coupled with switching action from a supply source, to regulate an output voltage, current, or electric power. SMPSs are much preferred over linear power regulation, due to the relatively poor efficiency of linear power conversion systems. Simple SMPSs of early designs often used a diode for flywheel conduction when the switch connecting the magnetizing inductance to the source is switched off. In improving the efficiency of SMPSs, however, conduction diodes have been replaced by switching transistors such as metallic-oxide semiconductor field effect transistors (MOSFETs), or insulated gate field effect transistors (IGFET), which are synchronously switched to provide the necessary blocking and conduction functions at appropriate times. These transistors, which have fairly consistent "on" resistance when switched on, made convenient current sensing resistances to sense the current passing through the magnetizing inductance. However, as the on-resistance of these switching transistors has continued to decrease, the small resistance of circuit board conductors becomes significant as it is on the order of the on resistance of switching transistors. The effect of circuit board conductors becomes especially of concern in multi-phase converters where the distances between the switching transistor through which current is sensed for each phase circuit and the sensing circuit varies, resulting in different resistances for each phase which can lead to imbalanced current among the phases.

Accordingly, there is a need for a current sensing circuit that substantially reduces sensing errors in switching power converters due to circuit board variations.

BRIEF DESCRIPTION OF THE FIGURES

In the accompanying figures like reference numerals refer to identical or functionally similar elements throughout the separate views, together with the detailed description below, and are incorporated in and form part of the specification to further illustrate embodiments of concepts that include the claimed invention and explain various principles and advantages of those embodiments.

Figure 1:
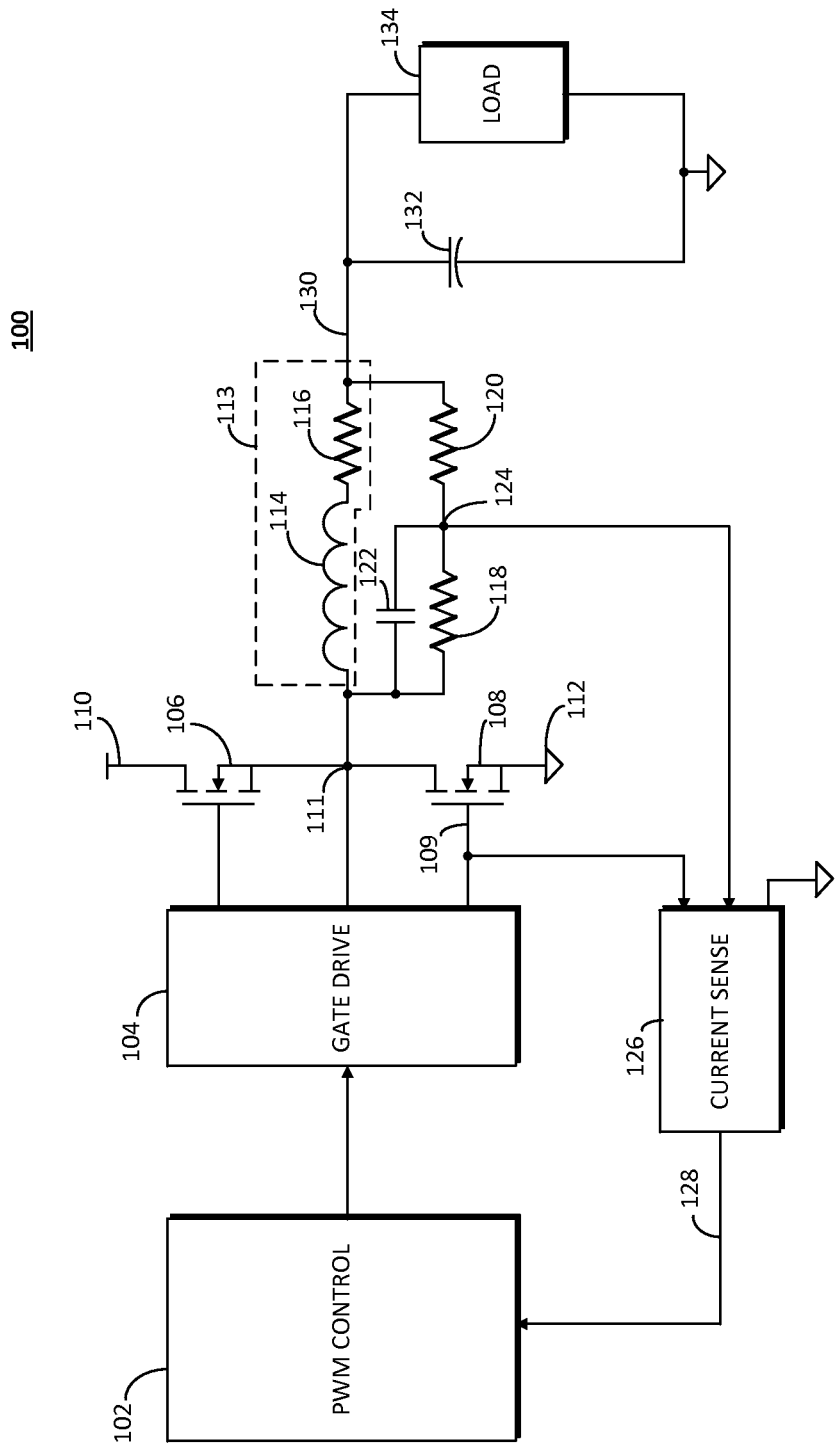
FIG. 1 is a block diagram of a power converter using a current sense circuit in accordance with some embodiments.

Those skilled in the field of the present disclosure will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein. The details of well-known elements, structure, or processes that would be necessary to practice the embodiments, and that would be well known to those of skill in the art, are not necessarily shown and should be assumed to be present unless otherwise indicated.

DETAILED DESCRIPTION

Embodiments disclosed herein include a current sensing circuit for a switched mode power converter that includes a first current sense resistance and a second current sense resistance coupled in series at a current sense node to form a series current sense resistance. The series current sense resistance is coupled in parallel with an inductor having an inductance and an inherent resistance, and a first end connected to a switching network. The switching network alternately connects and disconnects the inductor in series with a power source. When the switching network disconnects the inductor from the power source, current continues flowing through the inductor through another path, which can also be part of the switching network. The first current sense resistance is coupled to the first end of the inductor, and the second current sense resistance is coupled to a second end of the inductor. A capacitance is coupled in parallel with the first current sense resistance.

FIG. 1 is a block diagram electrical schematic of a power converter 100 using a current sense circuit in accordance with some embodiments. The power converter 100 is a switched mode power converter and can use pulse width modulation (PWM) to control switching operation, as is well known. Accordingly, a PWM controller 102 can generate a variable duty-cycle pulse signal to control a gate drive circuit 104. The gate drive circuit 104 provides drive signals to the switching transistors 106, 108. In the power converter 100 an upper switching transistor 106 is coupled between a supply voltage 110 and a half bridge node 111, and the lower switching transistor 108 is coupled between the half bridge node 111 and a ground 112. The upper and lower switches 106, 108 control current through an inductor 113, alternately connecting a first end of the inductance (i.e. the end connected to the half bridge node 111) to either the supply voltage 110 or the ground 112. The inductor 113 has an inductance 114 and an inherent resistance 116 which can be modeled as a resistance in series with the inductance 114 as shown. A second end of the inductor 113 is connected to an output 130 for an output network that can include an output filter capacitor 132 and a load 134. The output provided by the converter at output 130 is dependent on the load, and the duty cycle applied to the switching transistors 106, 108. Typically the output 130 is regulated to a desired current or voltage level, and the duty cycle applied to the switching transistor 106, 108 is varied in accordance with variations in the load 134 to maintain the output 130 at the regulated level.

Control of the switching of switching transistors 106, 108 (i.e. the PWM duty cycle) is based on sensing of the current through the inductance 113. To provide current sensing, a passive current sensing network is used which includes a current sensing resistance coupled in parallel with the inductor 113 between the first and second ends of the inductor 113 and, in some embodiments, includes a first current sensing resistance 118 and a second current sensing resistance 120. The first current sensing resistance 118 is coupled to the first end of the inductor 113, and the second current sensing resistance 120 is coupled to the second end of the inductor 113. The passive current sensing network further includes a capacitance 122 which is coupled in parallel with the first current sensing resistance 118. A current sense node 124 is formed where the first current sensing resistance 118 and capacitance 122 are connected to the second current sensing resistance 120. The voltage at the current sense node 124 is provided to a current sensing circuit 126, which can be referenced to ground 112, and is activated by the drive signal 109 used to drive the lower switching transistor 108. The current sensing circuit of FIG. 1 allows current sensing using only one wire by sensing the voltage at the current sense node 124 relative to ground (to which the current sensing circuit 126 is already connected), rather than sensing a differential voltage across one resistor coupled to the inductor 113 as in the prior art, which requires two wires (i.e. conductors). Sensing at the current sense node 124 relative to ground also provides a larger magnitude sensing signal compared to the voltage produced by the on-resistance of a switch (i.e. lower switch 108). Thus, it is much less affected by the resistance of the conductors between the current sense circuit 126 and the current sense node 124. Accordingly, the current sensing circuit of FIG. 1 is well-suited for use in multi-phase power converters where the physical location of circuit components are different for each phase, and thus each phase has a different length conductor between its respective current sense node and the current sense circuit. The magnitude of the sensing signal at the current sense node 124 is of a magnitude such that the resistance of circuit board conductors between the current sense node 124 and the current sense circuit is insubstantial, so variations between phases in a multi-phase circuit can largely be ignored in some embodiments.

The current sensed is related to the inductor current by the following equation:

$$V_{sense} = i_L * (R_{dson} + K * DCR); \quad \text{EQ1}$$

Where:

$V_{sense}$ is the sensing voltage between the sense node 124 and ground 112;

$i_L$ is the current through the inductor;

$R_{dson}$ is the on-resistance of the lower switch 108;

K is a ratio of the resistance values of current sense resistors 118, 120; and DCR is the value of the inherent resistance 116.

The ratio K is the value of the first current sense resistor ($R_{118}$) 118 over the sum of resistance of the first ($R_{118}$) and second ($R_{120}$) current sense resistances 118, 120:

$$K = R_{118}/(R_{118} + R_{120}). \quad \text{EQ2}$$

The first and second current sense resistances 118, 120 should be impedance matched to the inductor 113, relating the value (L) of the inductance 116, the inherent resistance (DCR) 116, the first ($R_{118}$) and second ($R_{120}$) current sense resistances 118, 120, and the capacitance (C) 122:

$$\frac{L}{DCR} = \left(\frac{R118 * R120}{R118 + R120}\right) * C \quad \text{EQ 3}$$

In some embodiments the first current sense resistance 118 may be omitted, in which case the value of K is one (1). The impedance matching in this case is:

$$\frac{L}{DCR} = R120 * C$$

The impedance matching of the first and second current sensing resistances 118, 120 and the capacitance 122 with the inductor 113 is necessary to make both AC and DC components in the inductor current signal have the same gain in the voltage across the sense capacitor 122.

Figure 2:
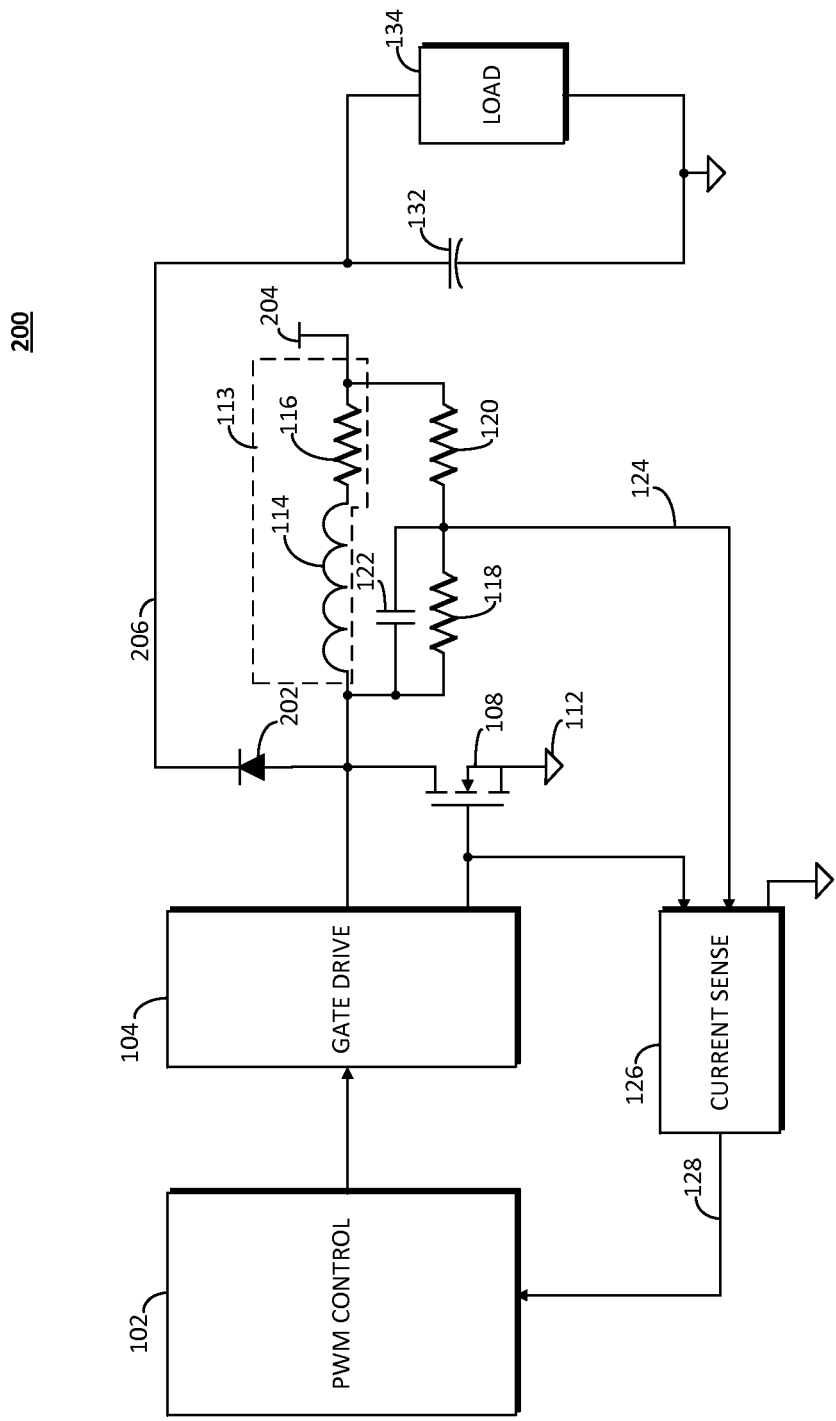
FIG. 2 is a block diagram of a power converter using a current sense circuit in accordance with some embodiments.

FIG. 2 is a block diagram of a power converter 200 using a current sense circuit in accordance with some embodiments. The current sensing circuit is the same as that used in FIG. 1, but the topology of the power converter is different. Current is drawn through the inductor 113 from a power source 204 (i.e. a voltage source) by turning switching transistor 108 on. When switching transistor 108 is turned off, current then flows through a diode 202 to an output line 206 which supplies load 134 and is filtered by output filter capacitor 132, resulting in a voltage that is higher than the power source 204. Accordingly the topology of FIG. 2 is a boost topology since the output voltage is higher than the input power source 204. The PWM controller 102 and gate drive circuit 104 therefore operate to drive the switch transistor 108 according to boost mode operation. The current sense circuit 126 senses inductor 113 current based on the voltage at the current sensing node 124, referenced to, for example, ground 112, and provides a current sense signal 128 as feedback to the PWM controller 102 to regulate the duty cycle of the PWM signal applied to the switching transistor 108.

Figure 3:
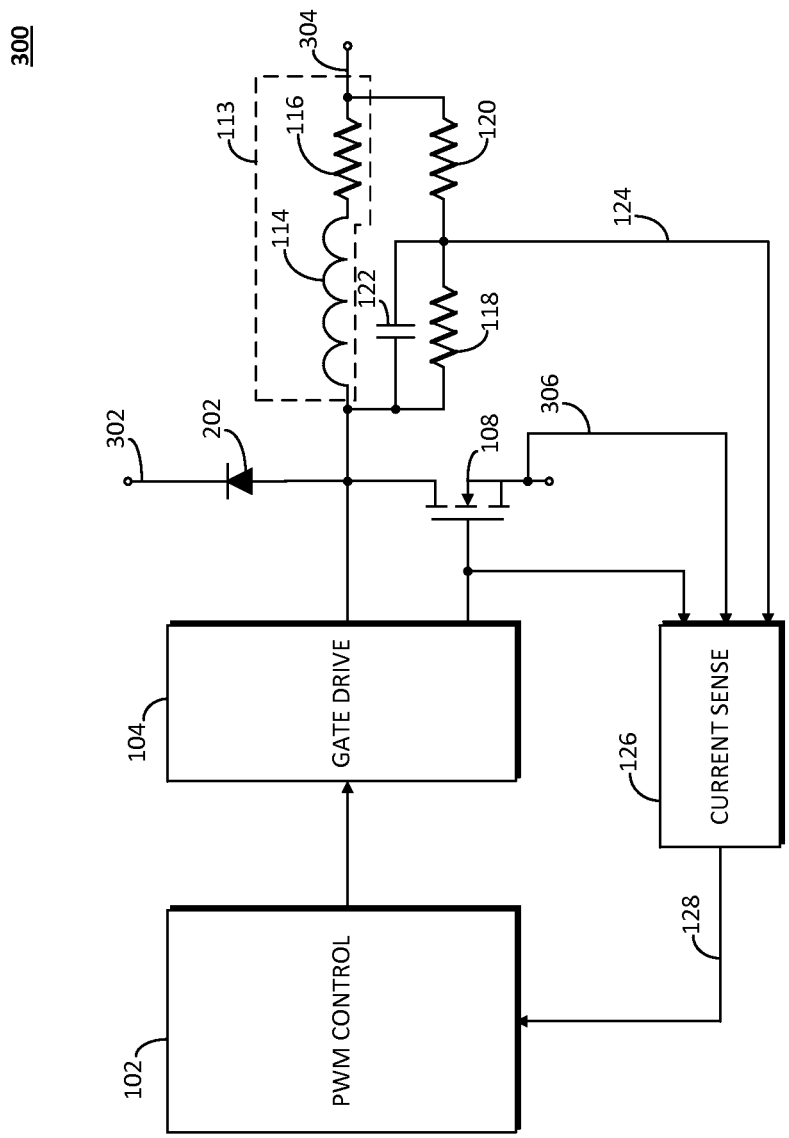
FIG. 3 is a block diagram of a power converter using a current sense circuit in accordance with some embodiments.

FIG. 3 is a block diagram of a power converter 300 using a current sense circuit in accordance with some embodiments. The topology of FIG. 3 is a generalized switching cell and similar to that of FIG. 2, with the exception of the current sensing circuit being referenced to the source terminal of switching transistor 108 instead of necessarily to ground. A power source 304 provides current which is drawn through the inductor 113 by switching action of the switching transistor 108. An output 302 is provided through diode 202. The PWM controller 102 and gate drive circuit 104 operate to drive the switch transistor 108 according to boost mode operation. The current sense circuit 126 senses current based on the voltage at the current sensing node 124, referenced to, for example, the negative terminal of the switching transistor via line 306, and provides a current sense signal 128 as feedback to the PWM controller 102.

Figure 4:
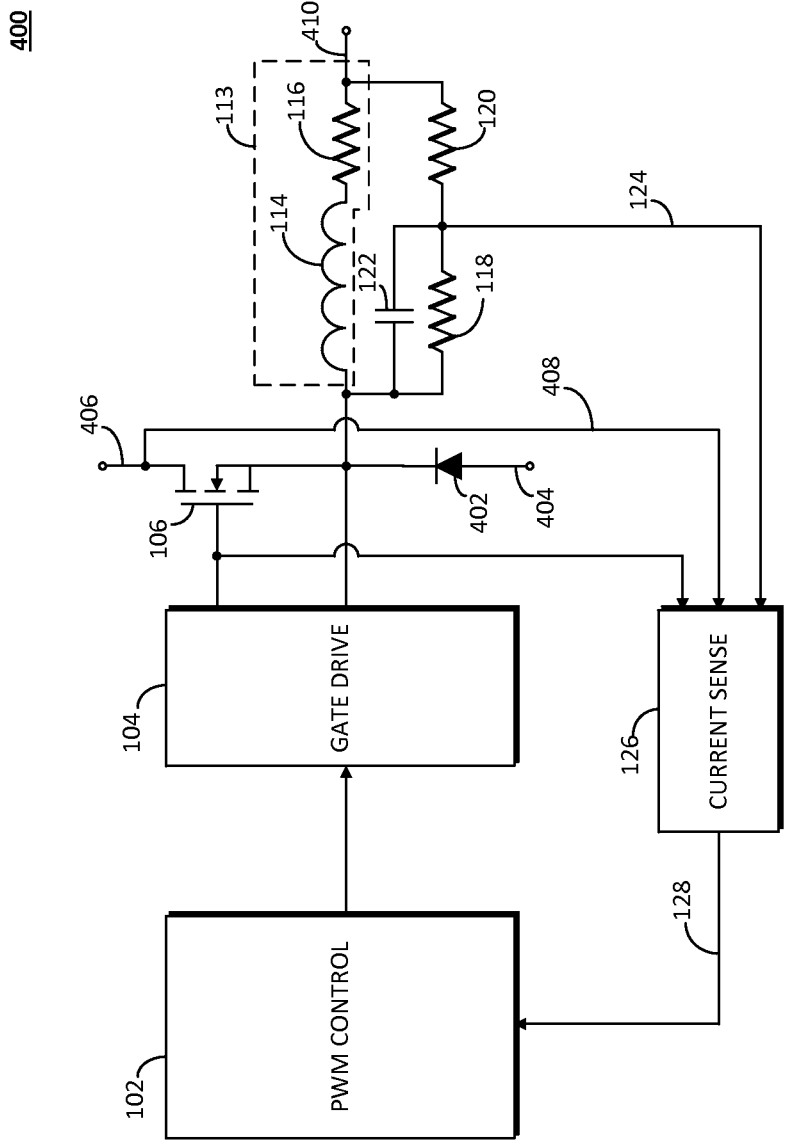
FIG. 4 is a block diagram of a power converter using a current sense circuit in accordance with some embodiments.

FIG. 4 is a block diagram of a power converter 400 using a current sense circuit 126 in accordance with some embodiments. The topology of FIG. 4 is a generalized switching cell having a different polarity than that of FIGS. 2-3 and is arranged in a general buck topology or other topologies such as buck-boost and zeta, etc. A switching transistor 106 can be connected to a power source 406 to switch current from the power source 406 into the inductor 113 to provide an output 410 (e.g. to a load and filter capacitor). A diode 402 allows conduction when switching transistor 106 is shut off, while current is flowing through the inductor 113 from a more negative voltage reference 404. The current sensing circuit 126 senses current as based on the voltage between the power source 406 and the current sense node 124 using line 408 when the switching transistor 106 is turned on, as indicated by the driving signal to the switching transistor 106. The PWM controller 102 and gate drive circuit 104 operate to drive the switch transistor 106 according to buck mode operation. The current sense circuit 126 senses current based on the voltage at the current sensing node 124, referenced to the power source 406 and provides a current sense signal 128 as feedback to the PWM controller 102.

As shown in FIGS. 1-4, some embodiments can include a current sensing arrangement for a switched mode power supply which includes an inductor having an inductance and an inherent resistance, and a first end connected to a switching transistor. The current sensing arrangement can be implemented with a passive current sensing network coupled in parallel with the inductor, wherein the passive current sensing network forms a current sense node. Furthermore, the passive current sensing network is impedance matched to the inductor (i.e. the inductance and inherent resistance). The current sensing arrangement can further be implemented with a current sense circuit that provides a current sense signal to a switching controller that drives the switching transistor, wherein the current sense signal is based on voltage produced at the current sense node relative to a reference to which the current sense circuit is connected.

Figure 5:
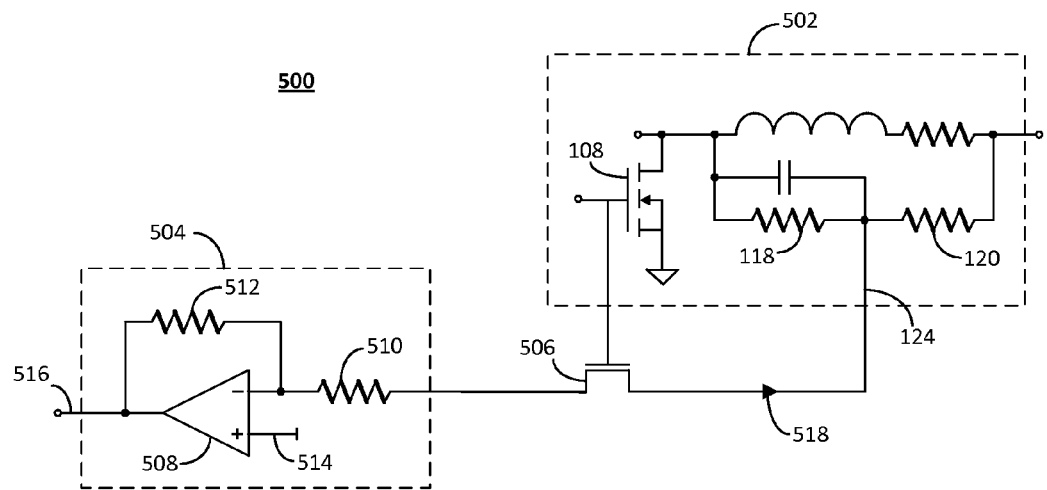
FIG. 5 is a block diagram of a power converter using a current sense circuit with leakage current control in accordance with some embodiments.

FIG. 5 is a block diagram of a power converter 500 using a current sense circuit with leakage current control in accordance with some embodiments. Leakage current through the current sense node 124 can create an error voltage due to current going through the current sense resistance of a portion 502 of the converter circuit. The error voltage can interfere with accurate current sensing. The current sense circuit (e.g. 126) can include an amplifier circuit 504 and a current sense switch 506. The amplifier circuit 504 includes an amplifier 508 using an input resistor 510 coupled to the inverting input, and a feedback resistor 512 that is coupled between the output 516 of the amplifier 508 and the inverting input. An offset voltage 514 is provided to the non-inverting input of the amplifier 508. The current sense switch 506 is driven with the switching transistor 108 so that the current sensing node 124 is only connected to the amplifier circuit 504 when the switching transistor 108 is switched on. The leakage current ($I_{LK}$) 518 can be determined as:

$$I_{LK} = \frac{Voffset - Vsense}{R510} * \frac{T - Ton}{T} \qquad \text{EQ 4}$$

Where:
Voffset is the offset voltage 514;
Vsense is the voltage at the sensing node 124;
$R_{510}$ is the resistance of input resistor 510;
T is the period of the pulse width modulation signal; and
$T_{on}$ is the on time of the pulse width modulation signal.
The resulting error $V_{error}$ can then be found as:

$$V_{error} = I_{LK}(R_{118}//R_{120}) \qquad \text{EQ5}$$

Where $R_{118}//R_{120}$ is the resulting resistance of resistors 118, 120 in parallel. To reduce the error, a low offset voltage 514 and a large value for the input resistor 510 should be used in the integrated circuit including the current sensing circuit. Furthermore, making the capacitance 122 large can allow for smaller values of the current sense resistors 118, 120. If the input resistor 510 is not substantially larger than the resistance of current sense resistors 118, 120 then it will have a loading effect on the sensing resistance, and the impedance matching will need to be addressed. Accordingly, in some embodiments, the input resistance can be at least an order of magnitude larger in resistance than the current sense resistances 118, 120. In some embodiments the offset voltage 514 can be on the order of hundreds of mV (e.g. 200 mV).

Figure 6:
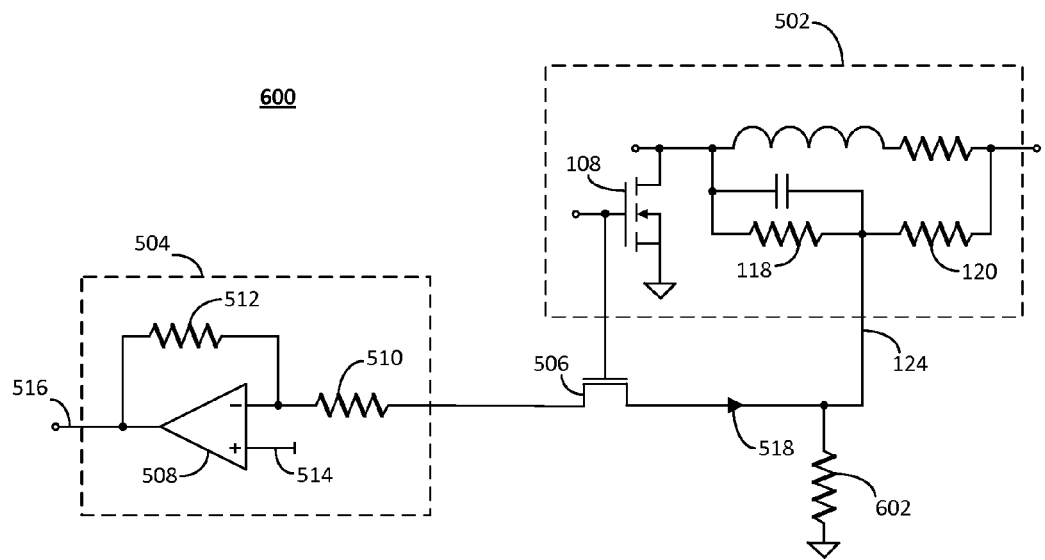
FIG. 6 is a block diagram of a power converter using a current sense circuit with leakage current control in accordance with some embodiments.

FIG. 6 is a block diagram of a power converter 600 using a current sense circuit with leakage current control in accordance with some embodiments. The power converter 600 is substantially similar to that of FIG. 5, but includes a leakage compensation resistor 602 is connected between the current sense node 124 and ground. The leakage current is then found by modifying EQ4 as:

$$I_{LK} = \frac{Voffset - Vsense}{R510} * \frac{T - Ton}{T} - \frac{Vout}{R602} \qquad \text{EQ 6}$$

Where $V_{out}$ is the output voltage (e.g. 130 of FIG. 1) and $R_{602}$ is the resistance of the leakage compensation resistor 602. The error voltage $V_{error}$ is then found by modifying EQ5 as:

$$V_{error} = I_{LK}(R_{118}//R_{120}//R_{602}) \qquad \text{EQ7}$$

Accordingly, the value of the compensation resistance 602 can be selected according to EQ6 to make the leakage current $I_{LK}$ to be close to zero over the operating range, which reduces the error caused by the leakage current.

Figure 7:
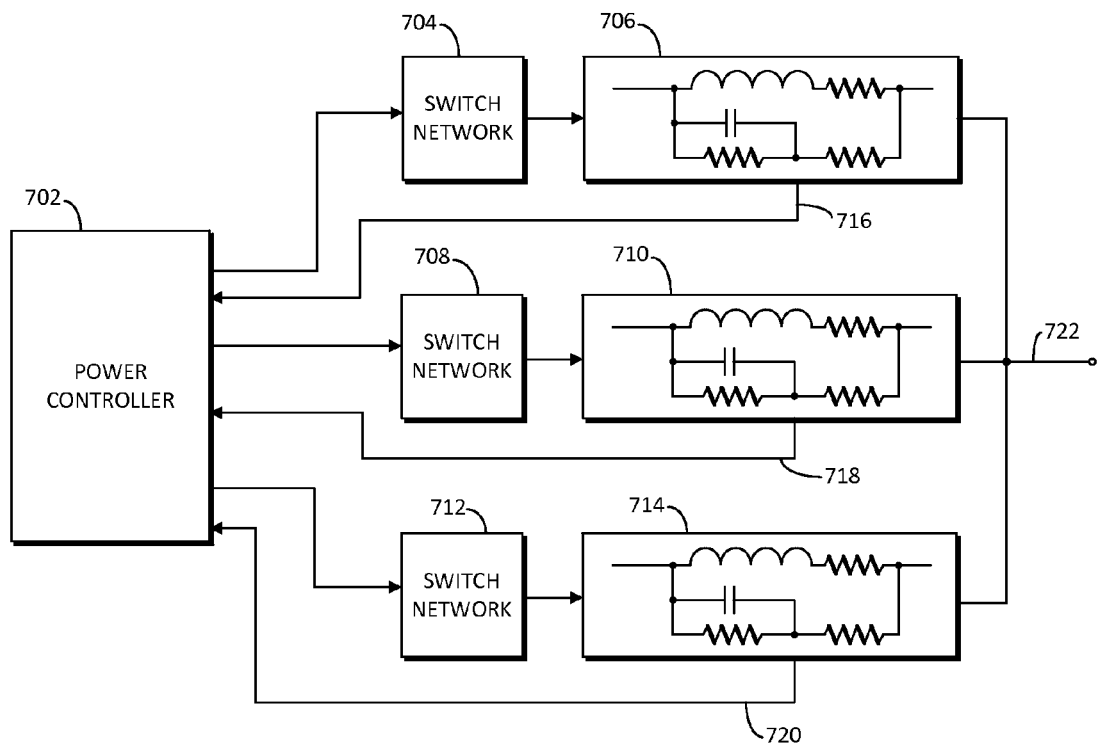
FIG. 7 is a block diagram of a multi-phase power converter with each phase using current sensing in accordance with some embodiments.

FIG. 7 is a block diagram of a multi-phase power converter 700 with each phase using current sensing in accordance with some embodiments. The power converter 700 includes a multi-phase power controller 702 which provides phased PWM signal to each of several phases. The phases include a first phase that includes a first switch network 704 and a first inductor and current sense network 706. A second phase includes a second switch network 708 and a second inductor and current sense network 710, and a third phase includes a third switch network 712 and a third inductor and current sense network 714. Each inductor and current sense network includes an inductor (i.e. inductor 113) having an inductance and inherent resistance, current sense resistors (i.e. 118, 120) coupled in series in parallel with the inductor, and a capacitor (i.e. 122) coupled in parallel with the first current sense resistance as shown in FIGS. 1-4. The power controller 702 receives current sensing feedback for each phase including a first current sense signal 716, a second current sense signal 718, and a third current sense signal 720. Each of the current sense signals 716, 718, 720 are voltages produced at the respective current sensing nodes of each current sensing circuit. Leakage compensation as shown in FIGS. 5-6 can be used in each phase. Each phase contributes to an output 722. Given the magnitude of the sensing voltage of current sense signals 716, 718, 720, the resistance of the power switches and board traces has little effect on the current sensing signals 716, 718, 720. Accordingly, the power controller 702 is able maintain a closer balance among the outputs of each respective phase.

As shown in FIG. 7, some embodiments can include a multi-phase switched mode power supply that includes a plurality of phased switching circuits which each contribute to an output of the multi-phase switched mode power supply. Each respective phase can also draw power from a common power source or power supply. The term phase or phased refers to time staggering of the switching of each respective phase circuit such that there is a regular interval between phases with respect to the period of a pulse in the pulse width modulation. Each of the plurality of phased switching circuits has an inductor that has an inductance value and an inherent resistance, and a first end connected to a switching transistor.

Each of the plurality of phases also includes a passive current sensing network coupled in parallel with the inductor and forming a current sense node. The passive current sensing network is impedance matched to the inductor. The multi-phase switched mode power supple further includes a current sense circuit that provides a respective current sense signal for each of the plurality of phase circuits to a switching controller that drives the respective switching transistor for each of the plurality of phase circuits. Each respective current sense signal is based on a respective voltage produced at the respective current sense node of each of the plurality of phased switching circuits relative to a common reference to which the current sense circuit is connected.

Accordingly, embodiments in accordance with those disclosed herein provide several benefits in the design and operation of switched mode power converters. One benefit is that the magnitude of the current sense signal is such that is substantially eliminates errors resulting from the resistance of conductors, such as runners on printed circuit boards, between the current sense node and the sensing circuit, where processing of the current sense signal takes place. Another benefit is that, at least in some embodiments, since the current sense signal can be sense with reference to a local ground (or other suitable reference voltage) at the sensing circuit, only one wire is needed, thereby eliminating the need for a differential sensing arrangement that requires two wires, as is common in the prior art. Another benefit is realized in multi-phased SMPSs, due to the substantial elimination of error among phases resulting from conductors in the current sense signal path.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description as part of the original disclosure, and remain so even if cancelled from the claims during prosecution of the application, with each claim standing on its own as a separately claimed subject matter. Furthermore, subject matter not shown should not be assumed to be necessarily present, and that in some instances it may become necessary to define the claims by use of negative limitations, which are supported herein by merely not showing the subject matter disclaimed in such negative limitations.

I claim:

1. A current sensing circuit for a power converter, comprising:
   a first current sense resistance and a second current sense resistance coupled in series at a current sense node to form a series current sense resistance;
   the series current sense resistance coupled in parallel with an inductor having an inductance and an inherent resistance, and a first end connected to a switching network;
   the first current sense resistance coupled to the first end of the inductor, and the second current sense resistance coupled to a second end of the inductor, wherein the first end of the inductor is coupled to a first end of a switching transistor, the switching transistor having a second end coupled to an input power source, the current sensing circuit further comprises:
   a field effect transistor having a first end coupled to the current sense node; and
   an amplifier circuit having a first input coupled to a second end of the field effect transistor and a second input coupled to an offset voltage reference;

wherein the switching transistor has a control terminal, and the field effect transistor has a control terminal coupled to the control terminal of the switching transistor; and a capacitance coupled in parallel with the first current sense resistance.

2. The current sensing circuit of claim 1, wherein a current sense voltage is provided between the current sense node and the ground.

3. The current sensing circuit of claim 1, wherein a current sense voltage is provided between the current sense node and a second end of the switching transistor.

4. The current sensing circuit of claim 1, wherein the input power source is a ground.

5. The current sensing circuit of claim 1, wherein the second end of the inductor is coupled to an output network.

6. The current sensing circuit of claim 1, further comprising a leakage compensation resistance coupled between the current sense node and the ground.

7. The current sensing circuit of claim 1, wherein the power converter is a multi-phase power converter, the current sensing circuit is duplicated for each phase of the multi-phase power converter.

8. A current sensing circuit for a switched mode power supply, comprising:
   an inductor having an inductance and an inherent resistance and a first end connected to a switching transistor;
   a passive current sensing network coupled in parallel with the inductor and forming a current sense node, wherein the passive current sensing network is impedance matched to the inductor, wherein the first end of the inductor is coupled to a first end of the switching transistor, the switching transistor having a second end coupled to a ground, the current sensing circuit further comprises:
      a field effect transistor having a first end coupled to the current sense node; and
      an amplifier circuit having a first input coupled to a second end of the field effect transistor and a second input coupled to an offset voltage reference;
   wherein the switching transistor has a control terminal and the field effect transistor has a control terminal coupled to the control terminal of the switching transistor; and
      a current sense circuit that provides a current sense signal to a switching controller that drives the switching transistor, wherein the current sense signal is based on voltage produced at the current sense node relative to a reference to which the current sense circuit is connected.

9. The current sensing circuit of claim 8, wherein the passive current sensing network comprises: a first current sense resistance and a second current sense resistance coupled in series at the current sense node to form a series current sense resistance; the series current sense resistance coupled in parallel with the inductor and a first end connected to the switching transistor; the first current sense resistance coupled to the first end of the inductor, and the second current sense resistance coupled to a second end of the inductor; and a capacitance coupled in parallel with the first current sense resistance.

10. The current sensing circuit of claim 9, wherein the passive current sensing network is impedance matched by keeping a ratio of values of the inductance to the inherent resistance of the inductor equal to a product of values of a resistance ratio and the capacitance, where the resistance ratio is a ratio of the product of resistance values of the first and second current sense resistances to the sum of the resistance values of the first and second current sense resistances.

11. The current sensing circuit of claim 8 further comprising a leakage compensation resistance coupled between the current sense node and the ground.

12. The current sensing circuit of claim 8, wherein a second end of the inductor is coupled to an output network.

13. The current sensing circuit of claim 8, wherein a second end of the inductor is coupled to an input power source.

14. The current sensing circuit of claim 8, wherein the switched mode power supply is a multi-phase switched mode power supply, and wherein the current sensing circuit is duplicated for each of a plurality of phases, where each phase contributes to an output of the switched mode power supply.

15. A multi-phase switched mode power supply, comprising:
   a plurality of phased switching circuits which each contribute to an output of the multi-phase switched mode power supply;
   each of the plurality of phased switching circuits having an inductor having an inductance value and an inherent resistance and a first end connected to a switching transistor, and a passive current sensing network coupled in parallel with the inductor and forming a current sense node, wherein the passive current sensing network is impedance matched to the inductor; wherein, for each of the respective plurality of phased switching circuits, the first end of the inductor is coupled to a first end of a switching transistor, the switching transistor having a second end coupled to a source of potential, the current sensing circuit further comprises:
      a field effect transistor having a first end coupled to the current sense node; and
      amplifier circuit having a first input coupled to a second end of the field effect transistor and a second input coupled to an offset voltage reference;
   wherein the switching transistor has a control terminal, the field effect transistor has a control terminal coupled to the control terminal of the switching transistor; and
   a current sense circuit that provides a respective current sense signal for each of the plurality of phase circuits to a switching controller that drives the respective switching transistor for each of the plurality of phase circuits, wherein each respective current sense signal is based on a respective voltage produced at the respective current sense node of each of the plurality of phased switching circuits relative to a common reference to which the current sense circuit is connected.

16. The multi-phase switched mode power supply of claim 15, wherein the passive current sensing network of each of the plurality of phased switching circuits is impedance matched by keeping a ratio of values of the inductance to the inherent resistance of the inductor equal to a product of values of a resistance ratio and the capacitance, where the resistance ratio is a ratio of the product of resistance values of the first and second current sense resistances to the sum of the resistance values of the first and second current sense resistances.

* * * * *